United States Patent [19]
Cross

[11] Patent Number: 4,890,363
[45] Date of Patent: Jan. 2, 1990

[54] SAFETY WHIP CHECKS FOR HOSES

[76] Inventor: Jerry R. Cross, 65092 Solar Rd., Montrose, Colo. 81401

[21] Appl. No.: 325,517

[22] Filed: Mar. 20, 1989

[51] Int. Cl.⁴ .............................................. A44B 15/00
[52] U.S. Cl. ........................................ 24/298; 24/300; 24/129 R
[58] Field of Search .................. 24/298, 300, 301, 335, 24/129 R, 129 A; 104/117; 105/148; 285/117

[56] References Cited
U.S. PATENT DOCUMENTS

| | | | |
|---|---|---|---|
| 487,041 | 11/1892 | Ziegler | 24/300 |
| 698,560 | 4/1902 | Rugg | 24/129 R |
| 2,820,269 | 1/1958 | Wolff | 24/300 |
| 3,197,240 | 7/1965 | Lindberg | 24/298 |
| 3,859,692 | 1/1975 | Waterman et al. | 24/300 |
| 3,891,257 | 6/1975 | Wilson | 24/129 R |
| 4,523,525 | 6/1985 | Foster | 104/117 |
| 4,549,332 | 10/1985 | Pouliot | 24/129 R |

FOREIGN PATENT DOCUMENTS 0958406 3/1950 France ................................. 24/300

Primary Examiner—Victor N. Sakran

[57] ABSTRACT

A safety attachment to restrain the whiplashes of hoses that become inadvertently uncoupled. A polyproylene rope harness is made to form loops that are engaged about the hoses. The loops increase in size for installation over the coupling element of the hose and then adjust to tightly engage the hose or an anchor element.

1 Claim, 1 Drawing Sheet

SAFETY WHIP CHECKS FOR HOSES

BACKGROUND OF THE INVENTION

In work areas where pressurized fluid or compressed air is delivered through hoses that connect with quick disconnect connectors, the connectors or the hoses themselves can become uncoupled. The resulting quick release of pressure causes a whipping action by the hose. A whipping hose can be dangerous. A safety whip check for hoses will prevent such dangerous conditions.

SUMMARY OF THE INVENTION

This invention is a safety attachment for a hose. Whip checks restrain the whiplashes of hoses that become inadvertently uncoupled. The attachment, comprised of hollow braid polyproylene rope, has looped ends that may be engaged about the hoses. The loop, at the time of installation, may be increased in size to accomodate the coupling element of the hose. Once installed, the loops are adjusted to tightly engage the hose or an anchor element.

DESCRIPTION OF THE INVENTION

Figure 1:
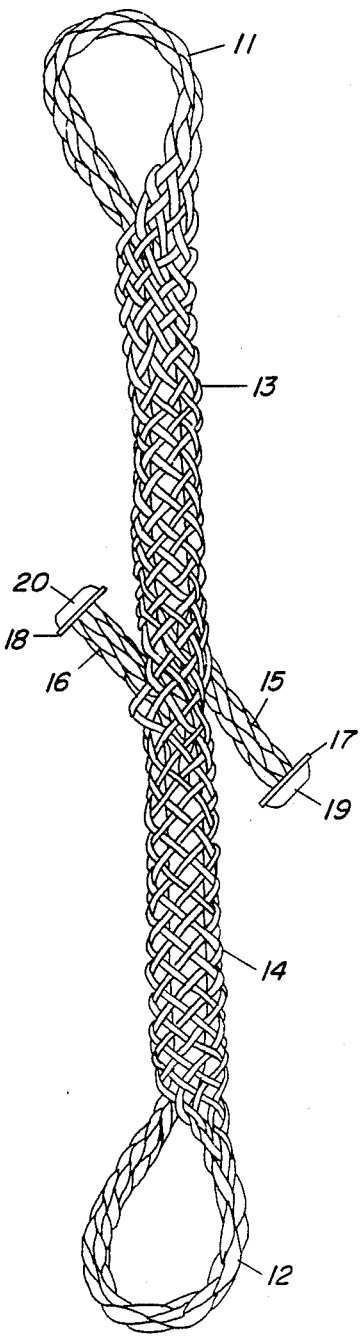
FIG. 1 is a side elevation showing the present device.

FIG. 1 shows the preferred embodiment of the invention. Starting with a piece of hollow braid polyproylene rope, the ends 15 and 16, using a splicing fid, are fed back through the hollow center section of the rope 13 and 14. This forms two loops 11 and 12, the ends 15 and 16 are passed through the outer braid at the midway point of the rope. Each end is passed through a flat washer 17 and 18. The ends of the rope are melted and molded into a button 19 and 20 which will not pass back through the flat washer. An electric calf dehorner, made by Rhinart Mfg. Co. Inc. is used to melt the rope ends.

The built-in nature of hollow braid rope gives it a "Chinese finger trap" effect. When hollow braid is compressed, the hollow center diameter increases in size, allowing the outer braid to be slid over the rope running down the center. When tension is applied, the outer braid squeezes the rope passing through the center. The more tension applied, the tighter the squeeze.

Figure 2:
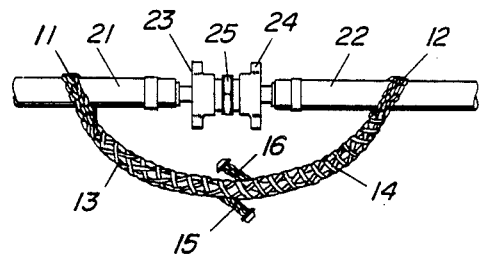
FIG. 2 is a side elevation showing coupled hoses.

The size of loops 11 and 12 can be increased by compressing the outer piece of polyproylene rope, so that the loop can be passed over the coupling element of the hose. Once the safety restraint is in place on the hose FIG. 2, the installer pulls on the ends using the washers until the loops securely engages the hoses. Since the size of the loops 11 and 12 can be varied, the "poly" whip check will accomodate a number of hose and anchor element sizes.

Figure 3:
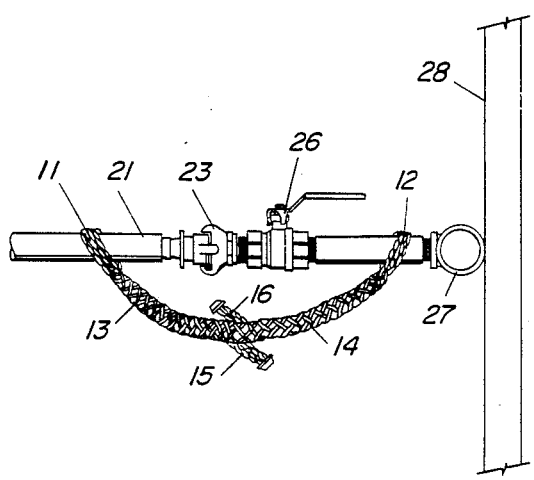
FIG. 3 is a side elevation showing additional use of the device.

FIG. 3 shows the application of a "poly" whip check used where a flexible hose 21 is connected to a permanently installed piping system 27. One loop 11 of the whip check is engaged over an element of the piping system 27 and the other loop 12 over the connected hose 21.

I claim:

1. A safety attachment for restraining inadvertently uncoupled hoses, comprising; a piece of hollow braid polypropylene rope in which the ends are fed back through the hollow center section of the rope and passed through the outer braid at the midway point of the rope, where each end is passed through a flat washer and then melted, this forms two loops joined together, these loops, at the time of installation, increase in size to accommodate the coupling element of the hose, once installed, the loops are adjusted to tightly engage the hose or an anchor element, an uncoupled hose applies tension to the loops, causing the outer braid to squeeze the rope passing through the center, a "Chinese finger trap" effect, the more tension applied, the tighter the squeeze, therefore; securing the hose from whipping.

* * * * *